United States Patent
Inukai et al.

(10) Patent No.: US 11,860,372 B2
(45) Date of Patent: Jan. 2, 2024

(54) DISPLAY CONTROL DEVICE, IMAGE DISPLAY SYSTEM, MOBILE BODY, DISPLAY CONTROL METHOD, AND NON-TRANSITORY COMPUTER-READABLE MEDIUM

(71) Applicant: PANASONIC INTELLECTUAL PROPERTY MANAGEMENT CO., LTD., Osaka (JP)

(72) Inventors: Fumihito Inukai, Kyoto (JP); Toshiya Mori, Osaka (JP); Masanaga Tsuji, Osaka (JP); Ken'ichi Kasazumi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 222 days.

(21) Appl. No.: 17/560,755

(22) Filed: Dec. 23, 2021

(65) Prior Publication Data
US 2022/0113547 A1 Apr. 14, 2022

Related U.S. Application Data

(63) Continuation of application No. PCT/JP2020/007880, filed on Feb. 26, 2020.

(30) Foreign Application Priority Data

Jun. 27, 2019 (JP) .................. 2019-120438

(51) Int. Cl.
*G09G 5/00* (2006.01)
*G02B 27/01* (2006.01)
(Continued)

(52) U.S. Cl.
CPC .......... *G02B 27/0179* (2013.01); *B60K 35/00* (2013.01); *G02B 27/0101* (2013.01);
(Continued)

(58) Field of Classification Search
CPC ............ G02B 27/0179; G02B 27/0101; B60K 35/00; G09B 3/001
(Continued)

(56) References Cited

U.S. PATENT DOCUMENTS

2010/0171858 A1 7/2010 Osawa
2011/0134498 A1* 6/2011 Ohta .................. G02B 26/0816
359/200.7
(Continued)

FOREIGN PATENT DOCUMENTS

JP 01-293239 11/1989
JP 2010-160272 7/2010
(Continued)

OTHER PUBLICATIONS

Written Opinion of the International Searching Authority issued in International Pat. Appl. No. PCT/JP2020/007880, dated Jun. 2, 2020, along with an English translation thereof.
(Continued)

*Primary Examiner* — Jonathan M Blancha
(74) *Attorney, Agent, or Firm* — GREENBLUM & BERNSTEIN, P.L.C.

(57) ABSTRACT

A display control device is configured to control a display position of an image in an image projector configured to project the image onto a display object of a mobile body. The display control device includes a processor; and a memory storing instructions that, when executed by the processor, cause the display control device to perform operations including: acquiring a detection value of an acceleration acting on the mobile body; calculating an attitude angle of
(Continued)

the mobile body based on the detection value of the acceleration; and setting a correction amount of the display position for controlling the display position of the image to be projected onto the display object by adjusting a correction amount per predetermined unit time in accordance with a change amount of the attitude angle in a predetermined period.

20 Claims, 10 Drawing Sheets

(51) Int. Cl.
    *B60K 35/00*     (2006.01)
    *G09G 3/00*     (2006.01)
    *G09G 3/36*     (2006.01)
    *H04N 9/31*     (2006.01)

(52) U.S. Cl.
    CPC ...... *G09G 3/001* (2013.01); *B60K 2370/1529* (2019.05); *G02B 2027/014* (2013.01); *G02B 2027/0183* (2013.01); *G09G 3/3611* (2013.01); *G09G 2320/068* (2013.01); *G09G 2340/0464* (2013.01); *G09G 2380/10* (2013.01); *H04N 9/3185* (2013.01)

(58) Field of Classification Search
    USPC .......................................................... 345/7
    See application file for complete search history.

(56) References Cited

U.S. PATENT DOCUMENTS

| | | | |
|---|---|---|---|
| 2016/0216521 A1* | 7/2016 | Yachida | .................... B60R 1/00 |
| 2017/0297477 A1* | 10/2017 | Kasaba | .................... B60Q 1/08 |
| 2019/0139286 A1* | 5/2019 | Shimoda | .............. G08G 1/0962 |
| 2019/0333481 A1* | 10/2019 | Hato | .................. G02B 27/0101 |
| 2020/0124851 A1* | 4/2020 | Higashiyama | ......... B60K 35/00 |

FOREIGN PATENT DOCUMENTS

| | | |
|---|---|---|
| JP | 2011-123126 | 6/2011 |
| JP | 2011-197510 | 10/2011 |
| JP | 2017-142533 | 8/2017 |
| WO | 2016/114159 | 7/2016 |
| WO | 2016/190135 | 12/2016 |
| WO | 2018/042898 | 3/2018 |

OTHER PUBLICATIONS

International Search Report issued in International Pat. Appl. No. PCT/JP2020/007880, dated Jun. 2, 2020, along with an English translation thereof.

* cited by examiner

FIG. 11

| CORRECTION AMOUNT OF DISPLAY POSITION | | DEVIATION OF ATTITUDE ANGLE MEASUREMENT VALUE DURING TRAVELING | | |
|---|---|---|---|---|
| | | SMALL | MEDIUM | LARGE |
| CHANGE AMOUNT OF ATTITUDE ANGLE | SMALL | CORRECTED TO VALUE AFTER CHANGE (STEPWISE CHANGE (FIRST EXAMPLE)) | CORRECTED TO INTERMEDIATE VALUE OF VALUES BEFORE AND AFTER CHANGE (STEPWISE CHANGE (FIRST EXAMPLE)) | NO CORRECTION |
| | LARGE | CORRECTED TO VALUE AFTER CHANGE (STEPWISE CHANGE (SECOND EXAMPLE)) | CORRECTED TO INTERMEDIATE VALUE OF VALUES BEFORE AND AFTER CHANGE (STEPWISE CHANGE (SECOND EXAMPLE)) | NO CORRECTION |

DISPLAY CONTROL DEVICE, IMAGE DISPLAY SYSTEM, MOBILE BODY, DISPLAY CONTROL METHOD, AND NON-TRANSITORY COMPUTER-READABLE MEDIUM

CROSS-REFERENCE TO RELATED APPLICATIONS

This application is a continuation of PCT International Patent Application No. PCT/JP2020/007880 filed on Feb. 26, 2020, which claims the benefit of priority of Japanese Patent Application No. 2019-120438 filed on Jun. 27, 2019, the entire contents of which are incorporated herein by reference.

FIELD

The present disclosure relates to a display control device, an image display system, a mobile body, a display control method, and a non-transitory computer-readable medium.

BACKGROUND

As an example of an image display system that projects and displays an image on a display object, a head-up display device mounted on a mobile body such as a vehicle is known (for example, see JP-A-H01-293239). The head-up display device disclosed in JP-A-H01-293239 projects information from an image display device onto a front shield of a vehicle, thereby displaying information in a visual field of an observer in a superimposed manner. The head-up display device calculates an attitude angle of the vehicle by detecting an acceleration of the vehicle, and changes a display position of a superimposed image in accordance with the attitude angle.

In addition, there is known a control device for a vehicle lamp that performs automatic leveling control for automatically adjusting an irradiation direction of a vehicle headlamp in accordance with an inclination angle of a vehicle (for example, see WO-A1-2016/114159). WO-A1-2016/114159 discloses that an optical axis angle of a vehicle lamp is adjusted based on a change in an attitude angle during stop of a vehicle and a change in the attitude angle during traveling of the vehicle.

SUMMARY

In an image display system using a head-up display device or the like, there is a demand for further improvement in control of a display position of an image.

The present disclosure has been devised in view of the above circumstances, and an object thereof is to provide a display control device, an image display system, a mobile body, a display control method, and a program capable of improving control of a display position of an image.

As an aspect, the present disclosure provides a display control device configured to control a display position of an image in an image projector configured to project the image onto a display object of a mobile body, the display control device including: a processor; and a memory storing instructions that, when executed by the processor, cause the display control device to perform operations including: setting a correction amount used for correction of the display position; and controlling the display position of the image based on the correction amount, wherein the setting the correction amount includes: acquiring a detection value of an acceleration acting on the mobile body; calculating an attitude angle of the mobile body based on the detection value of the acceleration; and setting the correction amount of the display position for controlling the display position of the image to be projected onto the display object in accordance with the attitude angle, and wherein the correction amount of the display position is set by adjusting a correction amount per predetermined unit time in accordance with a change amount of the attitude angle in a predetermined period.

As an aspect, the present disclosure provides an image display system to be mounted on a mobile body, the image display system including: an image projector configured to project an image onto a display object of the mobile body; and the display control device described above.

As an aspect, the present disclosure provides a mobile body including the image display system described above, wherein the display object includes a window shield of the mobile body.

As an aspect, the present disclosure provides a display control method for controlling a display position of an image in an image projector configured to project the image onto a display object of a mobile body, the display control method including: acquiring a detection value of an acceleration acting on the mobile body; calculating an attitude angle of the mobile body based on the detection value of the acceleration; and setting a correction amount of the display position for controlling the display position of the image to be projected onto the display object in accordance with the attitude angle, wherein the correction amount of the display position is set by adjusting a correction amount per predetermined unit time, in accordance with a change amount of the attitude angle in a predetermined period.

As an aspect, the present disclosure provides a non-transitory computer-readable medium storing a program, when executed by a processor, causing a computer to execute the display control method described above.

According to the present disclosure, it is possible to improve control of a display position of an image.

BRIEF DESCRIPTION OF DRAWINGS

FIG. 11 is an illustrative table illustrating an example of a correction amount of a display position corresponding to a deviation of an attitude angle measurement value during traveling and a change amount of the attitude angle according to the embodiment.

DETAILED DESCRIPTION

Hereinafter, embodiments in which a display control device, an image display system, a mobile body, a display control method, and a program according to the present disclosure are specifically disclosed will be described in detail with reference to the drawings as appropriate. However, an unnecessary detailed description may be omitted. For example, a detailed description of a well-known matter or a repeated description of substantially the same configuration may be omitted. This is to avoid unnecessary redundancy of the following description and to facilitate understanding of those skilled in the art. Note that the accompanying drawings and the following description are provided for a thorough understanding of the present disclosure by those skilled in the art, and are not intended to limit the subject matter recited in the claims.

(Introduction to Present Disclosure)

In an image display system using a head-up display device or the like, when control is performed to change a display position in accordance with a change in an attitude angle of a mobile body such as a vehicle, a user may experience a feeling of discomfort in visual recognition. For example, in a case where a correction amount of the display position is large, the user may experience a feeling of discomfort in appearance when the display position is suddenly changed.

Therefore, in the present disclosure, a display control device capable of improving visibility by appropriately adjusting a correction amount of a display position in accordance with a change amount of an attitude angle, and an image display system including the display control device are exemplified.

(Overview of Embodiment)

In the following embodiment, a vehicle such as an automobile is assumed as an example of a mobile body, and a configuration example of an image display system mounted on the vehicle and a display control device in the image display system will be described.

Figure 1:
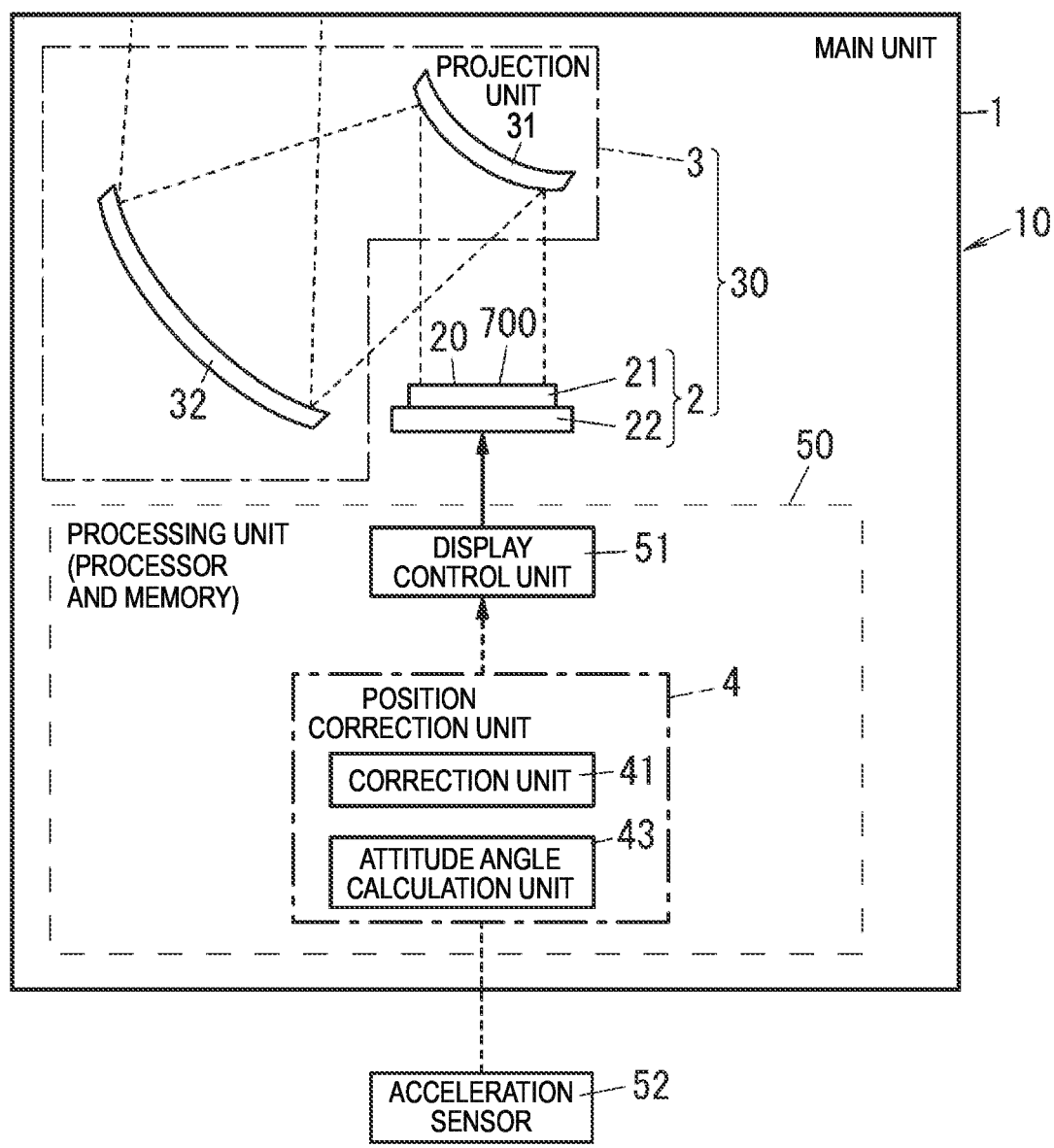
FIG. 1 is a conceptual diagram illustrating an example of a configuration of an image display system including a display control device according to an embodiment.
Figure 2:
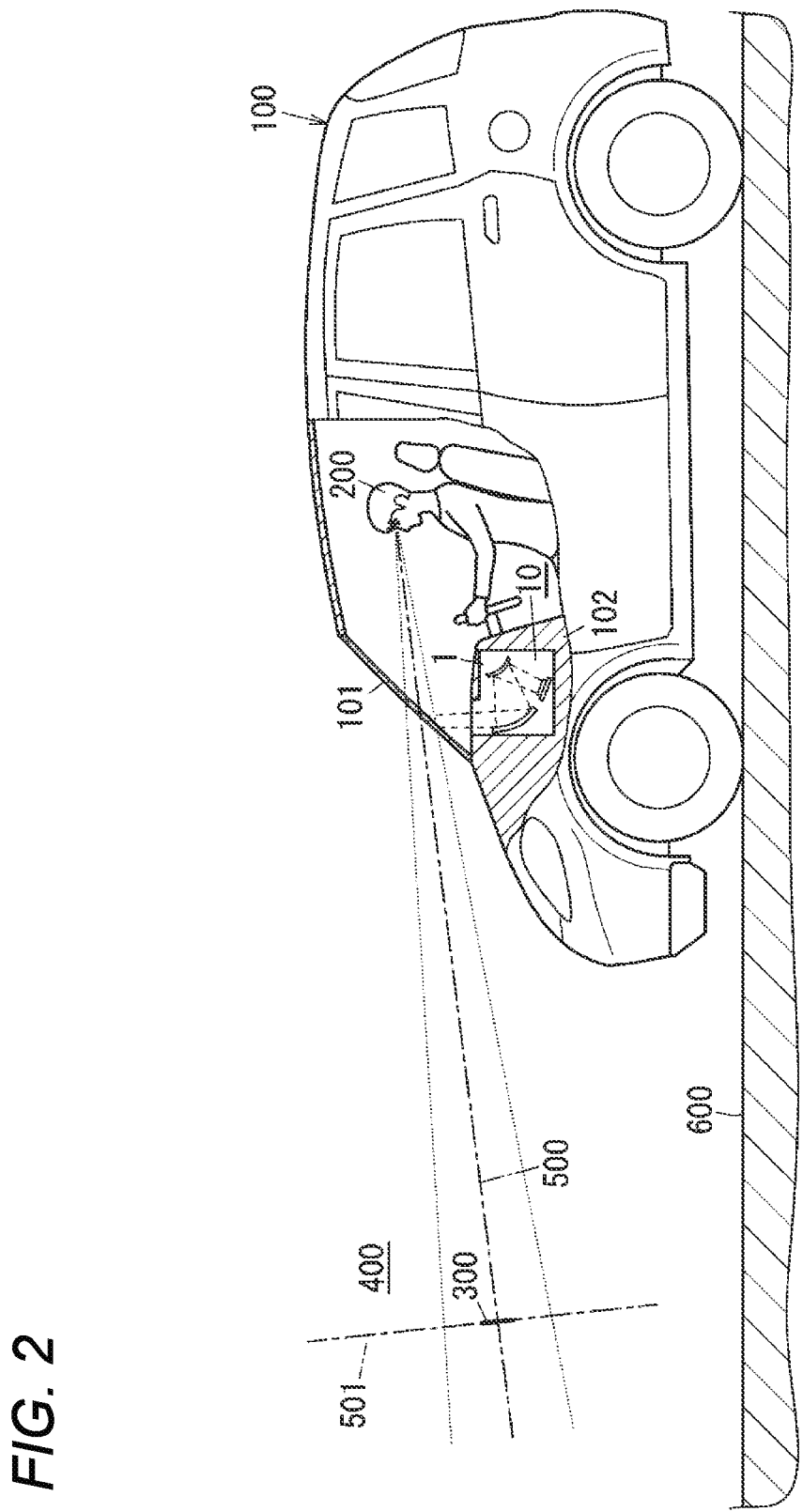
FIG. 2 is a conceptual diagram of a vehicle including the image display system according to the embodiment.

FIG. 1 is a conceptual diagram illustrating an example of a configuration of an image display system according to an embodiment. FIG. 2 is a conceptual diagram of a vehicle including the image display system according to the embodiment. As illustrated in FIGS. 1 and 2, an image display system 10 according to the present embodiment includes, for example, a head-up display (HUD) provided in a vehicle 100 serving as an example of a mobile body. That is, the vehicle 100 includes a mobile body main body and the image display system 10 provided in the mobile body main body.

The image display system 10 is installed in a vehicle interior of the vehicle 100 so as to project an image onto a front shield 101 (an example of a window shield) of the vehicle 100 from below. In the example of FIG. 2, the image display system 10 is disposed in a dashboard 102 below the front shield 101.

As illustrated in FIG. 2, with display of the image display system 10, a user 200 visually recognizes a virtual image 300, which is projected in a target space 400 set in front of the vehicle 100 (outside the vehicle), through the front shield 101. The "virtual image" referred to here means an image formed as if an object actually exists by a divergent light beam when light emitted from the image display system 10 is diverged by a display object such as the front shield 101. Therefore, the user 200 who is driving the vehicle 100 can see the virtual image 300, which corresponds to an image projected by the image display system 10, overlapping a real space spreading in front of the vehicle 100. Therefore, according to the image display system 10, it is possible to cause the user 200 to visually recognize various types of driving support information such as vehicle speed information, navigation information, pedestrian information, preceding vehicle information, lane departure information, and vehicle condition information as the virtual image 300. Accordingly, the user 200 can visually acquire the driving support information only by a slight movement of a line of sight from a state where the line of sight is directed to a front side of the front shield 101.

In the image display system 10 according to the present embodiment, the virtual image 300 formed in target space 400 includes at least two types of virtual images, that is, a first virtual image 301 and a second virtual image 302. The "first virtual image" referred to here relates to, for example, information indicating a traveling direction of the vehicle 100 as navigation information. As the first virtual image 301, an arrow indicating a right turn or a left turn can be presented on a road surface 600. The first virtual image 301 of this type is a virtual image corresponding to an image displayed using augmented reality (AR) technology, and is superimposed and displayed at a specific position in a real scene (the road surface 600, a building, a surrounding vehicle, a pedestrian, and the like) viewed from the user 200. The "second virtual image" relates to, for example, information indicating a state of the vehicle 100 as instrument information. As the second virtual image 302, vehicle speed information or the like indicating a current traveling speed (vehicle speed) of the vehicle 100 can be presented. Specific examples of the first virtual image 301 and the second virtual image 302 will be described later.

In the image display system 10, the virtual image 300 formed in the target space 400 is formed on a virtual plane 501 intersecting an optical axis 500 of the image display system 10.

As illustrated in FIG. 1, the image display system 10 according to the present embodiment includes a main unit 1 including an image projection unit 30 (an example of an image projector). The image projection unit 30 forms an image 700 and projects the formed image 700 onto the front shield 101, thereby forming the virtual image 300 corresponding to the image 700 in the target space 400. The image projection unit 30 includes an image forming unit 2 and a projection unit 3.

The image forming unit 2 includes a display surface 20, and forms the image 700 on the display surface 20. The image forming unit 2 projects the formed image onto the projection unit 3 by output light. The projection unit 3 projects the image projected from the image forming unit 2 onto the front shield 101.

In a state where the main unit 1 including the image forming unit 2 and the projection unit 3 is mounted on the vehicle 100, for example, an attitude of the main unit 1 changes with an attitude of the vehicle 100 due to a load of the vehicle 100. Since the image projection unit 30 is mounted in the main unit 1, an attitude of the image projection unit 30 is the same as the attitude of the main unit 1. Therefore, the attitude of the main unit 1 is also the attitude of the image projection unit 30.

Specifically, for example, in a case where the vehicle 100 is in a forward-inclined attitude such as when an occupant is present in a front seat such as a driver's seat, the main unit 1 is also in a forward-inclined attitude; in a case where the vehicle 100 is in a backward-inclined attitude such as when an occupant is present in a rear seat or when luggage is placed in a trunk, the main unit 1 is also in a backward-inclined attitude. When the attitude of the main unit 1 of the image display system 10 (an attitude angle of the image projection unit 30) changes, a position of the virtual image 300 projected by the image display system 10 in the target space 400 also changes. For this reason, for example, in a case where the vehicle 100 is in a forward-inclined attitude or a backward-inclined attitude, the first virtual image 301, for example, may be displayed in a superimposed manner at a position deviated from a specific position where the first virtual image 301 should be originally superimposed in a real scene viewed from the user 200.

Accordingly, a display position of the virtual image 300 is adjusted by adjusting a display position of the image 700 on the front shield 101 in accordance with an attitude angle of the main unit 1. For this reason, for example, even when the vehicle 100 is in a forward-inclined attitude or a backward-inclined attitude, the image display system 10 can superimpose and display, for example, the first virtual image 301 at the specific position where the first virtual image 301 should be originally superimposed in the real scene viewed from the user 200.

(Configuration of Embodiment)

As illustrated in FIG. 1, the image display system 10 according to the present embodiment includes the image projection unit 30 and a processing unit 50. In the present embodiment, an example in which a component (the processing unit 50) other than the image projection unit 30 is mounted (accommodated) in the main unit 1 is described, but the present disclosure is not limited thereto. The processing unit 50 may not be included in the main unit 1. The main unit 1 is fixed in the dashboard 102 of the vehicle 100. The processing unit 50 may be configured separately from the image projection unit 30, and may be configured as a separate housing device that is not mounted on the main body unit 1. The main unit 1 may include a plurality of housings.

The image forming unit 2 of the image projection unit 30 includes, for example, a liquid crystal panel 21 (LCD: Liquid Crystal Display) and a light source device 22. The liquid crystal panel 21 is disposed on a front side of the light source device 22. A front surface (a surface on a side opposite to the light source device 22) of the liquid crystal panel 21 constitutes the display surface 20 on which the image 700 is formed. The light source device 22 is used as a backlight of the liquid crystal panel 21. Light from the light source device 22 passes through the liquid crystal panel 21 from a back side of the liquid crystal panel 21 and is output from the image forming unit 2. The light source device 22 is a surface light source that irradiates substantially the entire area of a back surface of the liquid crystal panel 21 with light using a solid-state light emitting element such as a light emitting diode or a laser diode.

In the image forming unit 2, when the light source device 22 emits light in a state where the image 700 is displayed on the liquid crystal panel 21, light output toward a front side from the light source device 22 passes through the liquid crystal panel 21 and is output toward the front side from the front surface (the display surface 20) of the liquid crystal panel 21. At this time, the light output toward the front side from the display surface 20 is light (image light) reflecting the image 700 displayed on the liquid crystal panel 21. Therefore, when the display surface 20 is viewed from the front side, the image 700 appears to be displayed on the display surface 20, and the image 700 is formed on the display surface 20.

Although a configuration in which the image forming unit 2 includes the liquid crystal panel 201 is exemplified, the image forming unit 2 is not limited to such a configuration. For example, the image forming unit 2 may be configured to form the image 700 by performing scanning with laser light from a back surface of the display surface 20 of the image forming unit 2.

The projection unit 3 of the image projection unit 30 includes a first mirror 31 and a second mirror 32. The first mirror 31 and the second mirror 32 are arranged in an order of the first mirror 31 and the second mirror 32 on an optical path of the output light from the image forming unit 2. The first mirror 31 reflects the output light of the image forming unit 2 toward the second mirror 32. The second mirror 32 reflects, toward an upper side (that is, toward the front shield 101), the output light of the image forming unit 2 reflected by the first mirror 31.

With this configuration, the projection unit 3 enlarges or reduces the image 700 displayed on the display surface 20 of the image forming unit 2 to an appropriate size, and projects the enlarged or reduced image 700 onto the front shield 101 as a projection image. As a result, the virtual image 300 is displayed in the target space 400. That is, in the visual field of the user 200 driving the vehicle 100, the virtual image 300 of the image 700 projected from the image display system 10 is displayed in a manner of being superimposed on an actual scene spreading in front of the vehicle 100.

The processing unit 50 includes a position correction unit 4 and a display control unit 51. The processing unit 50 is configured with a computer or the like including a processor and a memory, and implements various functions, for example, by the processor executing a predetermined program held in the memory. The processor may include a micro processing unit (MPU), a central processing unit (CPU), a digital signal processor (DSP), a graphical processing unit (GPU), and the like. The memory may include a random access memory (RAM), a read only memory (ROM), and the like. Although a case where the program is recorded in advance in the memory of the processing unit 50 is illustrated here, the program may be provided through a telecommunication line such as the Internet, or may be provided by being recorded in a recording medium such as a memory card. The processing unit 50 may be provided in a control unit such as an electronic control unit (ECU) that controls each unit of the vehicle. The position correction unit 4 and the display control unit 51 may be configured with separate processors, or at least a part of functions of the position correction unit 4 and the display control unit 51 may be shared by one processor.

The position correction unit 4 calculates an attitude of the main unit 1 (more specifically, an attitude angle of the vehicle 100) based on a detection value of an acceleration sensor 52, calculates a correction amount for changing the display position of the image 700 on the display surface 20 based on the calculated attitude angle, and outputs the correction amount to the display control unit 51.

The display control unit 51 controls the image forming unit 2 to form an arbitrary image 700 on the display surface 20. In addition, the display control unit 51 controls the display position of the image 700 on the display surface 20. At this time, the display control unit 51 adjusts the display position of the image 700 on the display surface 20 based on the correction amount from the position correction unit 4, and changes the display position in accordance with the attitude angle. Accordingly, the display control unit 51 controls the display position of the image 700 on the front shield 101. As a result, a position of the virtual image 300 projected to a display area of the target space 400 is controlled.

The acceleration sensor 52 detects an acceleration (gravitational acceleration and motion acceleration) acting on the vehicle 100. The acceleration sensor 52 includes, for example, a triaxial acceleration sensor having an X axis, a Y axis, and a Z axis orthogonal to one another. The acceleration sensor 52 is attached to the vehicle 100 in an arbitrary attitude, and detects an acceleration vector generated in the vehicle 100. The motion acceleration is an acceleration generated in the vehicle 100 by acceleration or deceleration due to traveling of the vehicle 100. That is, the motion acceleration is an acceleration obtained by excluding the gravitational acceleration from the acceleration acting on the vehicle 100. The motion acceleration is generated, for example, in a direction opposite to an acceleration direction of the vehicle 100. The acceleration acting on the vehicle 100 and the calculation of the attitude angle based on the acceleration will be described later.

The position correction unit 4 includes a correction unit 41 and an attitude angle calculation unit 43. The attitude angle calculation unit 43 calculates the attitude angle of the main unit 1 based on time-series data of the detection value of the acceleration sensor 52 by software processing. More specifically, the attitude angle calculation unit 43 calculates the attitude angle of the vehicle 100 based on the time-series data of the detection value of the acceleration sensor 52, and sets the calculated attitude angle as the attitude angle of the main unit 1.

The correction unit 41 calculates a correction value for changing the display position of the image 700 on the display surface 20, based on the attitude angle calculated by the attitude angle calculation unit 43 (that is, the attitude angle of the main unit 1) by software processing, and corrects display position control performed by the display control unit 51. For at least the first virtual image 301, the correction unit 41 controls the display control unit 51 to change the position of the image 700 on the display surface 20, so as to absorb (reduce) a change in the position of the virtual image 300 in the target space 400 due to a change in the attitude angle of the main unit 1.

The display control unit 51 displays (renders) arbitrary video content on the liquid crystal panel 21 while controlling the display position of the image 700 on the display surface 20 by software processing. Accordingly, an arbitrary image 700 is formed at a predetermined position on the display surface 20. The position correction unit 4 and the display control unit 51 control the display position of the image to change the position of the image 700 on the display surface 20, thereby changing the position of the image 700 projected onto the front shield 101, and as a result, the position of the virtual image 300 projected to the display area of the target space 400 is also changed.

As described above, when the attitude of the main unit 1 changes, the image display system 10 can control the position where the virtual image 300 is formed by changing the display position of the image 700 on the display surface 20 in accordance with the change. For example, the first virtual image 301 can be corrected to the specific position where the first virtual image 301 should be originally superimposed in the real scene viewed from the user 200, and the user 200 can visually recognize the first virtual image 301.

(Measurement of Attitude Angle)

Next, an acceleration acting on the vehicle 100 and measurement of an attitude angle calculated based on the acceleration will be described.

Figure 3A:
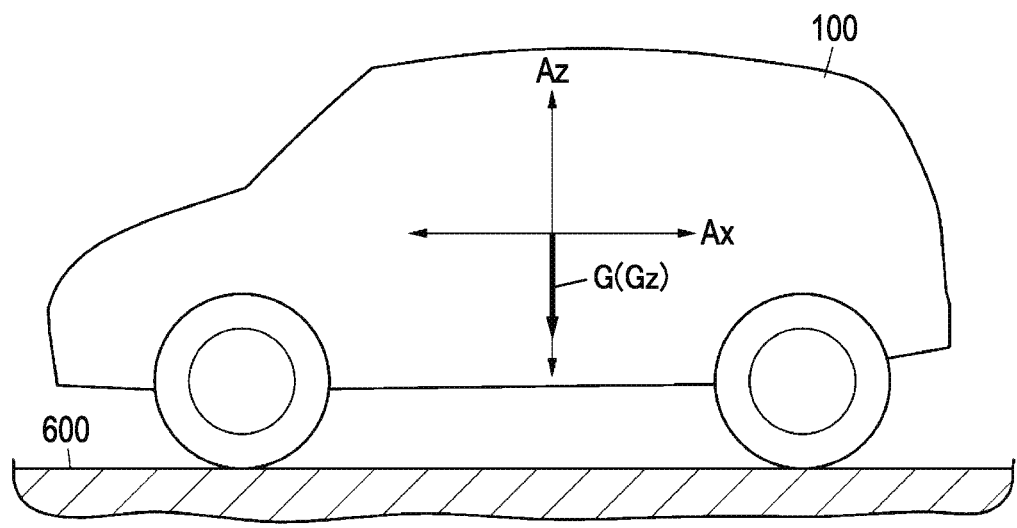
FIG. 3A is an illustrative diagram for illustrating a gravitational acceleration that acts when the vehicle is not inclined at the time of stop.
Figure 3B:
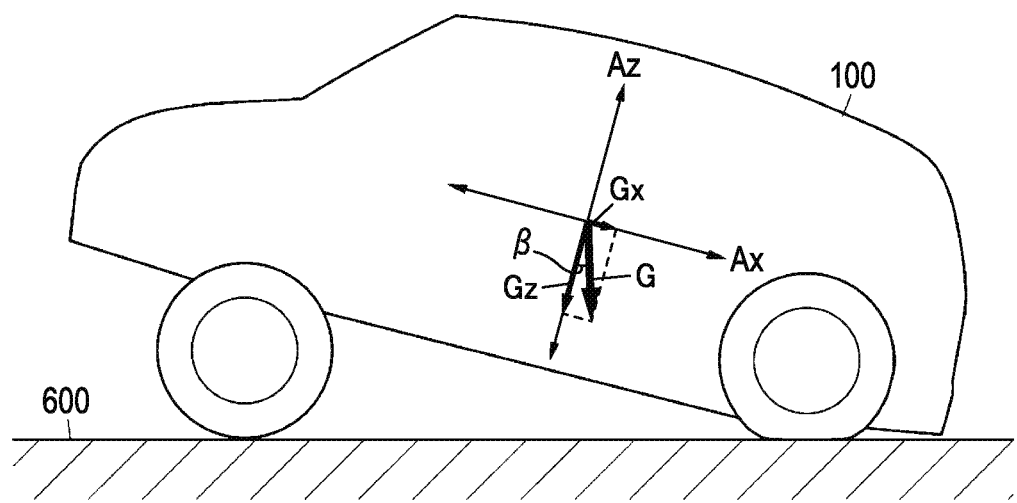
FIG. 3B is an illustrative diagram for illustrating a gravitational acceleration that acts when the vehicle is inclined at the time of stop.

FIG. 3A is an illustrative diagram for illustrating a gravitational acceleration that acts when the vehicle is not inclined at the time of stop. FIG. 3B is an illustrative diagram for illustrating a gravitational acceleration that acts when the vehicle is inclined at the time of stop. The attitude angle calculation unit 43 of the position correction unit 4 calculates an attitude angle based on a detection value of the acceleration sensor 52, thereby performing measurement of an attitude angle. In the present embodiment, an up-down axis Az direction (up-down direction), a front-rear axis Ax direction (front-rear direction), and a left-right axis Ay direction (left-right direction) are defined as a coordinate system (vehicle coordinate system) in the vehicle 100. The three-axis vehicle coordinate system is a virtual axis fixed to the vehicle 100. Although the left-right axis Ay in a direction perpendicular to a paper surface is not illustrated in the drawing, an acceleration component is also generated in the left-right axis Ay direction when the vehicle 100 is inclined in the left-right direction with respect to a traveling direction of the vehicle 100. The acceleration sensor 52 detects accelerations in the up-down axis Az direction, the front-rear axis Ax direction, and the left-right axis Ay direction.

In the present embodiment, when an Ax-Ay plane including the front-rear axis Ax and the left-right axis Ay is a reference plane of the vehicle 100 and the reference plane is parallel to the road surface 600, a calculation value (measurement value) of the attitude angle is zero. The attitude angle is calculated as inclination of the reference plane of the vehicle 100 with respect to the road surface 600 or inclination of the up-down axis Az of the vehicle 100 from a vertical line in a gravitational direction of the earth. Note that the attitude angle may be calculated using acceleration components in two directions of the up-down axis Az direction and the front-rear axis Ax direction, that is, the up-down direction and an orthogonal direction orthogonal to the up-down direction, without using an acceleration component in the left-right axis Ay direction.

When the vehicle 100 is stopped, as shown in FIGS. 3A and 3B, the attitude angle is calculated in accordance with a ratio of the gravitational acceleration in three axes of the up-down axis Az direction, the front-rear axis Ax direction, and the left-right axis Ay direction of the vehicle 100 during stop. Hereinafter, an algorithm for calculating the attitude angle during stop of the vehicle 100 will be referred to as a "stop algorithm". When the attitude of the vehicle 100 during stop is not inclined in the front-rear direction with respect to the road surface 600, the gravitational acceleration acting on the vehicle 100 acts only in the up-down axis Az direction of the vehicle 100. Therefore, an acceleration detection value G of the acceleration sensor 52 (that is, a detection value of the gravitational acceleration) includes only an acceleration component Gz in the up-down axis Az direction (see FIG. 3A).

On the other hand, when the attitude of the vehicle 100 during stop is inclined in, for example, the front-rear direction with respect to the road surface 600, the gravitational acceleration acting on the vehicle 100 acts in both the up-down axis Az direction and the front-rear axis Ax direction of the vehicle 100. FIG. 3B illustrates a state where the vehicle 100 is inclined rearward (a vehicle front portion faces obliquely upward) in cases such as one where luggage is loaded in a rear luggage compartment. Therefore, the acceleration detection value G of the acceleration sensor 52 has the acceleration component Gz in the up-down axis Az direction and an acceleration component Gx in the front-rear axis Ax direction (see FIG. 3B). In the attitude angle calculation unit 43, an attitude angle β calculated using the stop algorithm is obtained by the following equation (1).

[Equation (1)]

$$\beta = \arctan\left(\frac{Gx}{\sqrt{Gz^2 + Gy^2}}\right) \quad (1)$$

According to the stop algorithm described above, it is possible to calculate and observe the measurement value of the attitude angle during stop of the vehicle 100 and a change amount in the measurement value in real time. In practice, for example, an average value of attitude angle measurement values in a predetermined period such as several seconds to several minutes is obtained, and the change amount is calculated based on a time average value of the attitude angle.

In a case where the road surface 600 is inclined, for example, when the vehicle 100 is stopped on a slope, the attitude angle of the vehicle 100 during stop may not be correctly measured. In such a case, the attitude angle measurement value may be appropriately corrected so as not to include an inclination angle of the road surface, for example, by obtaining a difference between the attitude angle measurement values at predetermined time intervals and calculating an attitude angle from which a component of the inclination angle of the road surface is removed.

Figure 4A:
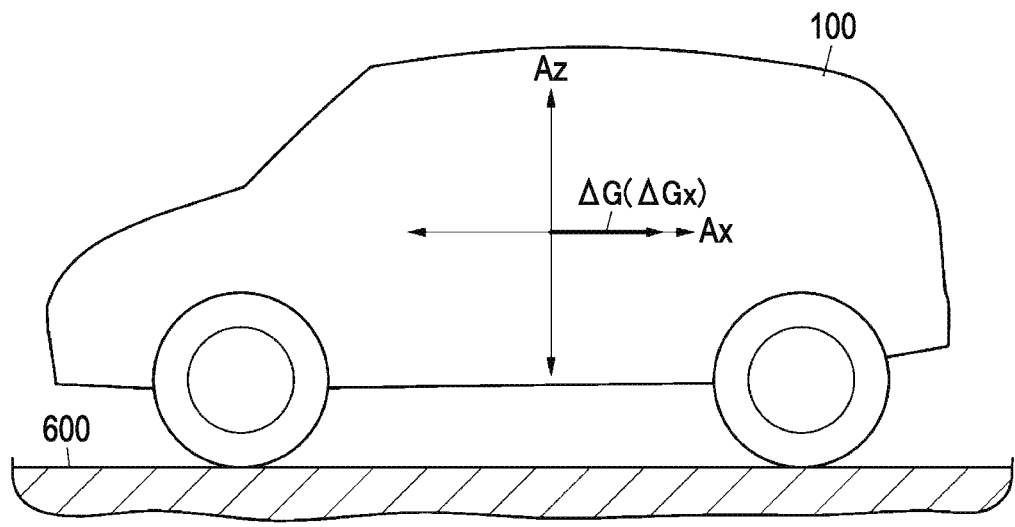
FIG. 4A is an illustrative diagram for illustrating a motion acceleration that acts when the vehicle is not inclined during traveling.
Figure 4B:
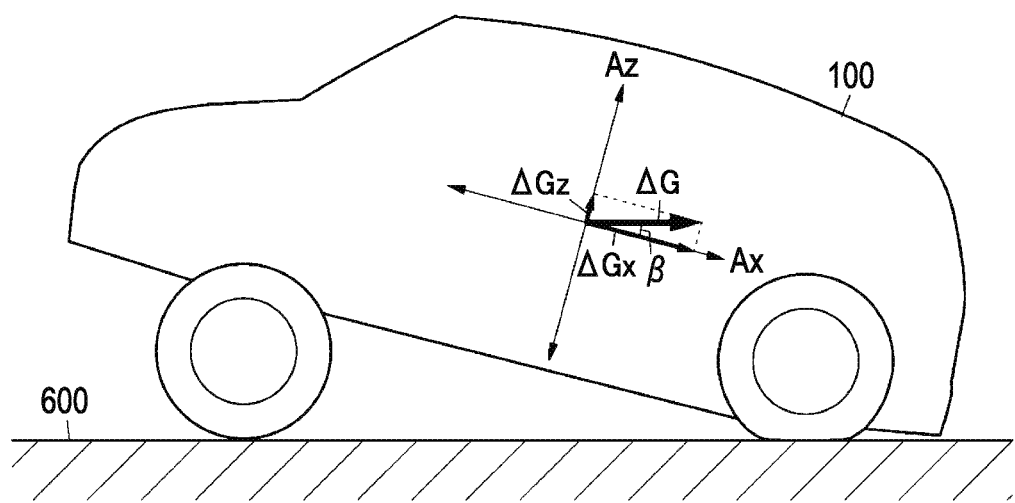
FIG. 4B is an illustrative diagram for illustrating a motion acceleration that acts when the vehicle is inclined during traveling.

FIG. 4A is an illustrative diagram for illustrating a motion acceleration that acts when a vehicle is not inclined during traveling. FIG. 4B is an illustrative diagram for illustrating a motion acceleration that acts when the vehicle is inclined during traveling. When the vehicle 100 is traveling, as illustrated in FIGS. 4A and 4B, the attitude angle is calculated in accordance with a ratio of change amounts of the motion acceleration in the three axes of the up-down axis Az direction, the front-rear axis Ax direction, and the left-right axis Ay direction of the vehicle 100 during traveling. Hereinafter, an algorithm for calculating the attitude angle during traveling of the vehicle 100 is referred to as a "traveling algorithm". When the attitude of the vehicle 100 traveling forward is not inclined in the front-rear direction with respect to the road surface 600, the motion acceleration acting on the vehicle 100 acts only in the front-rear axis Ax direction of the vehicle 100. Therefore, an acceleration detection value ΔG of the acceleration sensor 52 (that is, a detection value of the motion acceleration) has only an acceleration component ΔGx in the front-rear axis Ax direction (see FIG. 4A). In the traveling algorithm, since the motion acceleration is calculated based on a difference between the acceleration detection values at predetermined time intervals, change amounts of the motion acceleration are represented as ΔG, ΔGx, and the like.

On the other hand, when the attitude of the vehicle 100 traveling forward is inclined in, for example, the front-rear direction with respect to the road surface 600, the motion acceleration acting on the vehicle 100 acts in both the up-down axis Az direction and the front-rear axis Ax direction of the vehicle 100. FIG. 4B illustrates a state where the vehicle 100 is inclined rearward (the vehicle front portion faces obliquely upward) in cases such as one where luggage is loaded in the rear luggage compartment. Therefore, the acceleration detection value ΔG of the acceleration sensor 52 has the acceleration component ΔGx in the front-rear axis Ax direction and an acceleration component ΔGz in the up-down axis Az direction (see FIG. 4B). In the attitude angle calculation unit 43, an attitude angle β calculated using the traveling algorithm is obtained by the following equation (2).

[Equation (2)]

$$\beta = \arctan\left(\frac{\Delta Gz}{\sqrt{\Delta Gx^2 + \Delta Gy^2}}\right) \quad (2)$$

According to the traveling algorithm described above, it is possible to calculate the measurement value of the attitude angle during traveling of the vehicle 100 and a change amount in the measurement value. At this time, for example, an average value of attitude angle measurement values in a predetermined period such as several seconds to several minutes is obtained, and the change amount is calculated based on a time average value of the attitude angle.

(Display Position Control)

Next, display position control for the image 700 performed by the processing unit 50 including the position correction unit 4 and the display control unit 51 will be described.

Figure 5A:
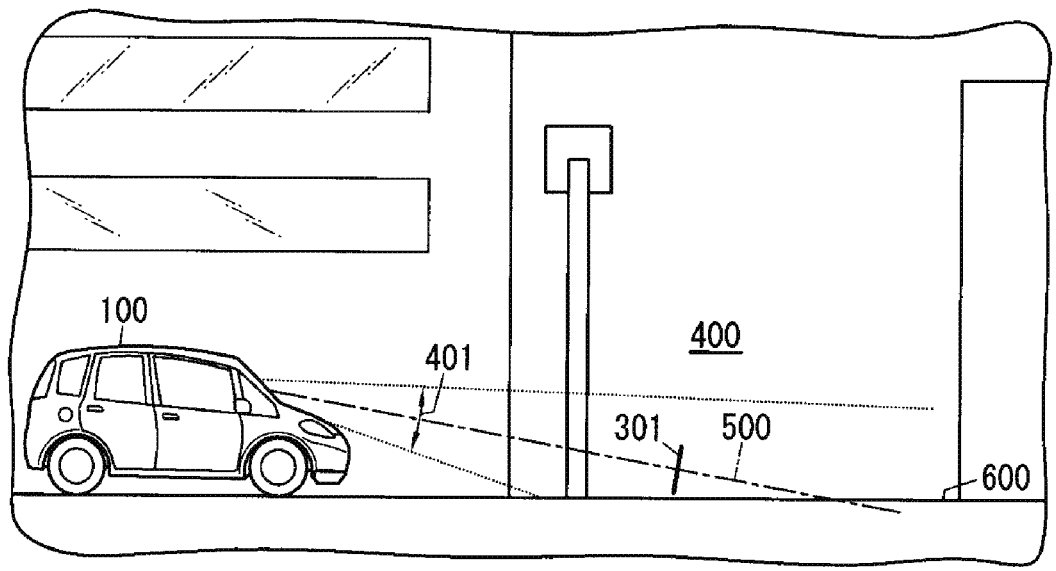
FIG. 5A is a schematic diagram of a vehicle that is not inclined as viewed from a lateral side.
Figure 5B:
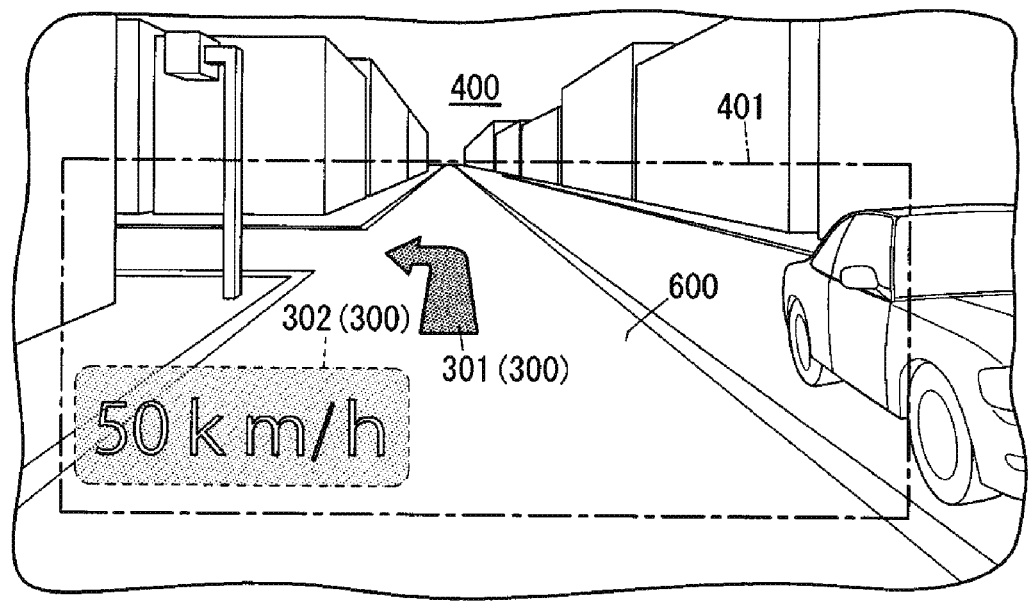
FIG. 5B is a conceptual diagram illustrating a visual field of a user who drives the vehicle in a state shown in FIG. 5A.

FIG. 5A is a schematic diagram of a vehicle that is not inclined with respect to a road surface (in a state of being parallel to the road surface) as viewed from a lateral side. FIG. 5B is a conceptual diagram illustrating a visual field of a user who drives the vehicle in the state shown in FIG. 5A. The image forming unit 2 and the projection unit 3 project and display the image 700 formed on the display surface 20 onto the front shield 101, thereby projecting the virtual image 300 corresponding to the image 700 to the target space 400. In the illustrated example, in the virtual image 300, the first virtual image 301 such as navigation information shows an arrow indicating a "left turn" on an intersection (T-shaped road) in front of the vehicle 100. In addition, the second virtual image 302 such as instrument information displays a traveling speed of "50 km/h" as current vehicle speed information of the vehicle 100.

When the virtual image 300 (the first virtual image 301 and the second virtual image 302) as in the illustrated example is to be projected to the target space 400, the display control unit 51 determines content of the first virtual image 301 (orientation, position, and the like of the arrow) and content of the second virtual image 302 (the vehicle speed and the like). In addition, the display control unit 51 also determines the position of the image 700 on the display surface 20 of the liquid crystal panel 21. When the position of the image 700 on the display surface 20 changes, the position of the virtual image 300 projected to a display area 401 of the target space 400 also changes.

The correction unit 41 of the position correction unit 4 generates a correction amount for changing the display position of the image 700 on the display surface 20, based on an attitude angle calculated by the attitude angle calculation unit 43 (that is, the attitude angle of the main unit 1), and outputs the correction amount to the display control unit 51. The display control unit 51 controls the position where the image 700 is to be displayed based on the correction amount of the display position acquired from the correction unit 41. By this control, the position of the virtual image 300 projected to the display area 401 of the target space 400 is corrected in accordance with the attitude angle of the main unit 1. The processing unit 50 including the position correction unit 4 and the display control unit 51 calculates, for at least the first virtual image 301, a correction amount of the display position so as to absorb (reduce) a change in position of the virtual image 300 in the target space 400 due to a change in the attitude angle of the main unit 1. Then, the processing unit 50 controls the display position in accordance with the correction amount. Accordingly, the position of the image 700 on the display surface 20 is changed.

More specifically, as illustrated in FIGS. 5A and 5B, in a state where the attitude angle of the vehicle 100 is a reference angle (for example, 0 degree), the processing unit 50 displays the virtual image 300 at a default display position without changing the position of the virtual image 300 (the first virtual image 301) projected to the display area 401 of the target space 400. Here, the default display position of the first virtual image 301 is a substantially central portion of the display area 401, that is, a position through which the optical axis 500 (see FIG. 5A) passes. In the illustrated example, an area in the target space 400 where the virtual image 300 can be projected is represented as the display area 401. Here, the first virtual image 301 represents an arrow indicating a "left turn" at a T-shaped road in front of the vehicle 100. That is, in the visual field of the user 200, the first virtual image 301 is displayed so as to be superimposed on the T-shaped road in the real scene in the display area 401. In addition, the second virtual image 302 is displayed at a position that is a lower left corner of the display area 401 (see FIG. 5B).

Figure 6A:
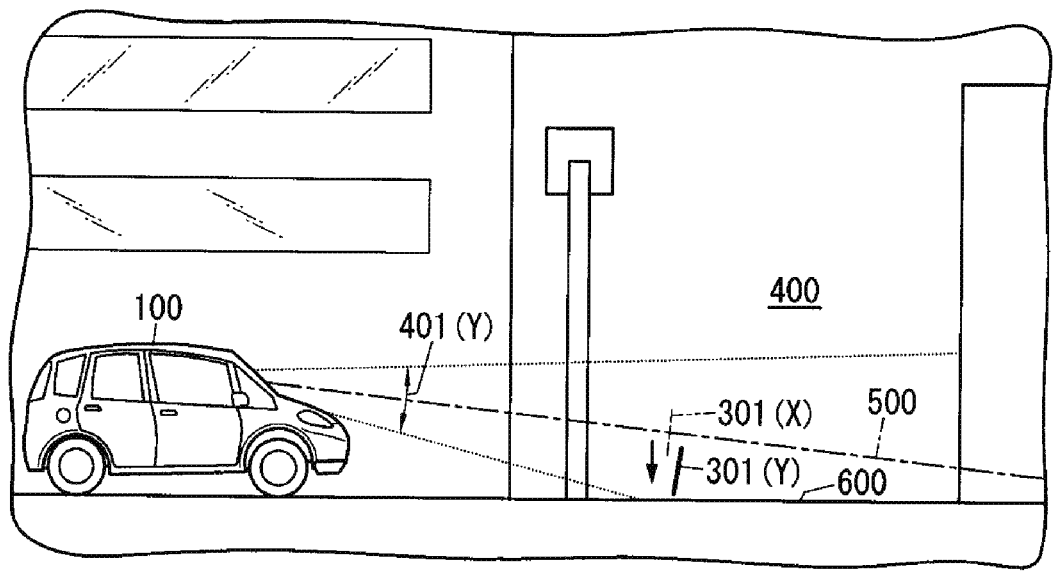
FIG. 6A is a schematic diagram of a vehicle that is inclined upward as viewed from a lateral side.
Figure 6B:
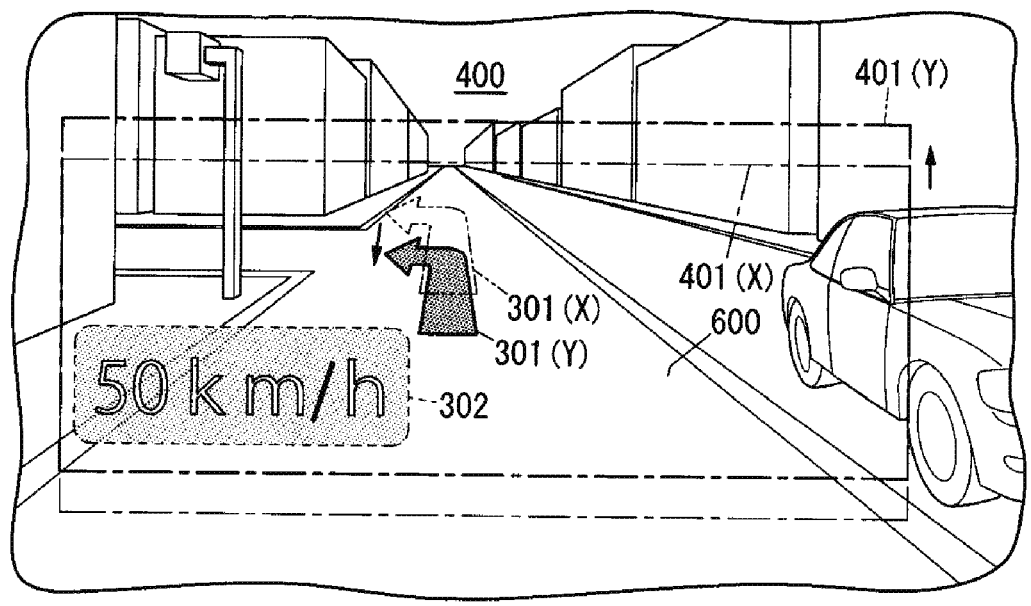
FIG. 6B is a conceptual diagram illustrating a visual field of a user who drives the vehicle in a state shown in FIG. 6A.

FIG. 6A is a schematic diagram of a vehicle that is inclined upward with respect to a road surface as viewed from a lateral side. FIG. 6B is a conceptual diagram illustrating a visual field of a user who drives the vehicle in the state shown in FIG. 6A. When the attitude angle of the vehicle 100 deviates from the reference angle and the vehicle 100 is inclined, the processing unit 50 changes the position of the virtual image 300 (the first virtual image 301) projected to the display area 401 of the target space 400 from the default display position. As illustrated in FIGS. 6A and 6B, for example, when the vehicle 100 is in a state of a backward-inclined attitude, the display area 401 and the first virtual image 301 move upward in the visual field of the user 200. That is, as illustrated in FIG. 6B, a display area 401 (Y) is formed at a position shifted upward with respect to a display area 401 (X) in a default state. Accordingly, at the default display position, a first virtual image 301 (X) is displayed substantially at a central portion of the display area 401 (Y). Therefore, in the visual field of the user 200, the first virtual image 301 (X) is displayed so as to be superimposed at a position shifted forward (toward a back side) from the T-shaped road in the real scene. Here, the display area 401 and the first virtual image 301 before the movement have reference numerals thereof assigned with an "X", and the display area 401 and the first virtual image 301 after the movement have reference numerals thereof assigned with a "Y", so that those before the movement and those after the movement are distinguished from each other.

In the case of the backward inclined state, the processing unit 50 changes the position of the image 700 on the display surface 20 so that the display position of the virtual image 300 is shifted downward. Accordingly, as illustrated in FIG. 6A, the position of the first virtual image 301 projected to the target space 400 moves downward, and in the display area 401 (Y), the first virtual image 301 (Y) is displayed at a position shifted downward with respect to the first virtual image 301 (X) in the default state. As a result, in the visual field of the user 200, as illustrated in FIG. 6B, the first virtual image 301 (Y) is displayed so as to be superimposed on the T-shaped road in the real scene in the display area 401 (Y). In addition, the second virtual image 302 is displayed at a position that is a lower left corner of the display area 401 (Y) (see FIG. 6B).

Figure 7A:
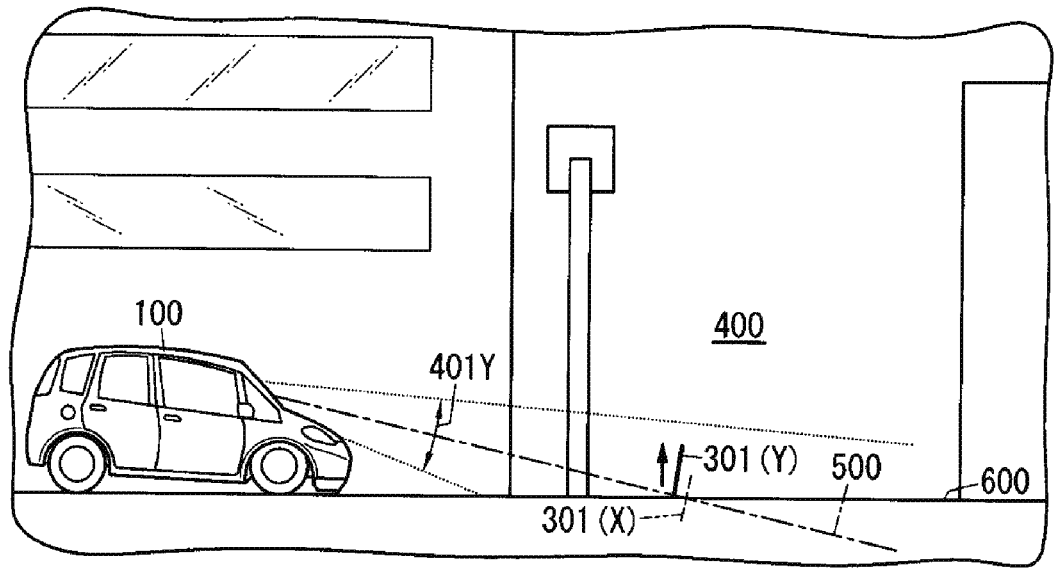
FIG. 7A is a schematic diagram of a vehicle that is inclined downward as viewed from a lateral side.
Figure 7B:
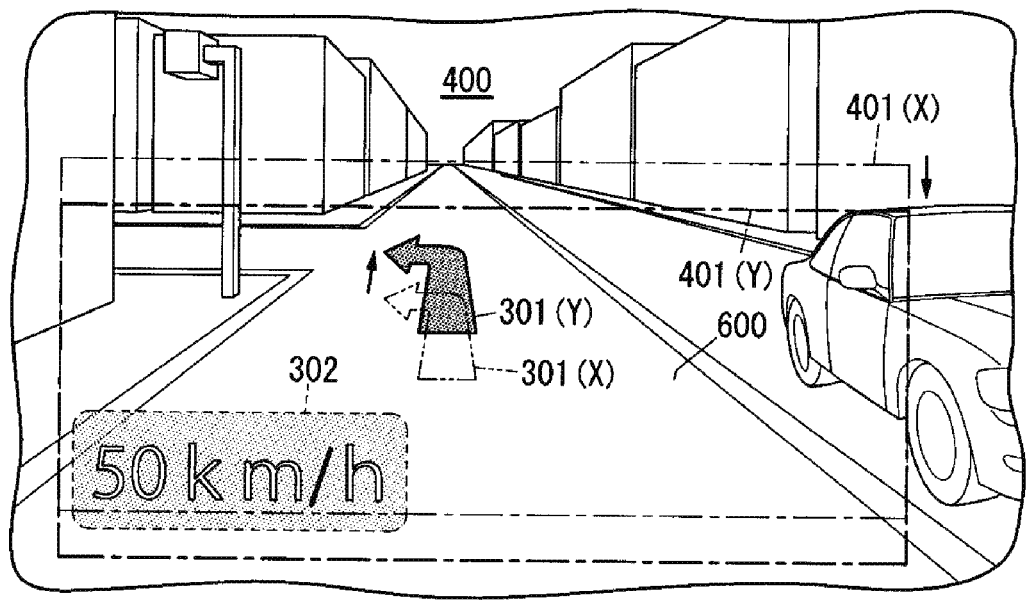
FIG. 7B is a conceptual diagram illustrating a visual field of a user who drives the vehicle in a state shown in FIG. 7A.

FIG. 7A is a schematic diagram of a vehicle that is inclined downward with respect to a road surface as viewed from a lateral side. FIG. 7B is a conceptual diagram illustrating a visual field of a user who drives the vehicle in the state shown in FIG. 7A. As illustrated in FIGS. 7A and 7B, for example, when the vehicle 100 is in a state of a forward-inclined attitude, the display area 401 and the first virtual image 301 move downward in the visual field of the user 200. That is, as illustrated in FIG. 7B, the display area 401 (Y) is formed at a position shifted downward with respect to the display area 401 (X) in the default state. Accordingly, at the default display position, the first virtual image 301 (X) is displayed substantially at the central portion of the display area 401 (Y). Therefore, in the visual field of the user 200, the first virtual image 301 (X) is displayed so as to be superimposed at a position shifted rearward (toward a near side) from the T-shaped road in the real scene.

In the case of the forward inclined state, the processing unit 50 changes the position of the image 700 on the display surface 20 so that the display position of the virtual image 300 is shifted upward. Accordingly, as illustrated in FIG. 7A, the position of the first virtual image 301 projected to the target space 400 moves forward, and in the display area 401 (Y), the first virtual image 301 (Y) is displayed at a position shifted upward with respect to the first virtual image 301 (X) in the default state. As a result, in the visual field of the user 200, as illustrated in FIG. 6B, the first virtual image 301 (Y) is displayed so as to be superimposed on the T-shaped road in the real scene in the display area 401 (Y). In addition, the second virtual image 302 is displayed at a position that is a lower left corner of the display area 401 (Y) (see FIG. 7B).

In a case of a head-up display device mounted on the vehicle 100, since the virtual image 300 is projected and superimposed on the road surface 600, an image displayed on an upper side of the display area 401 is projected far, and an image displayed on a lower side of the display area 401 is projected near. Therefore, when changing a display position of an image to be superimposed thereon, it is preferable to define a correction amount of the display position by angle in accordance with a change amount of an attitude angle. At this time, a range of the display area 401 is, for example, about 3 degrees in the up-down direction, and the position of the virtual image 300 superimposed on the road surface 600 greatly changes even by a small angle change of the display position.

In the present embodiment, for example, in the vehicle 100 during stop, an attitude angle at the time of stop is detected using the stop algorithm to calculate a change amount of the attitude angle, and display position correction is performed so that the change in the attitude angle is reflected in a display position of a projection image. Then, when the vehicle 100 travels, an attitude angle at the time of traveling is detected using the traveling algorithm to calculate a change amount of the attitude angle, and the display position of the projection image is corrected in accordance with the change in the attitude angle.

(Details of Display Position Control Processing)

In performing display position control for the virtual image 300 in accordance with an attitude angle of the vehicle 100 by display position control performed by the processing unit 50, in a case where a change amount of the attitude angle is large and position correction equal to or greater than a predetermined value is required, if a sudden movement of the image is caused by changing a display position thereof at one time, the user experiences a feeling of discomfort in visually recognizing the image. Therefore, in the present embodiment, a correction amount of the display position per predetermined unit time is adjusted in accordance with a change amount of the attitude angle in a predetermined period so that the display position does not change greatly at one time within the visual field of the user. Specifically, when the change amount of the attitude angle is equal to or greater than a predetermined value, a correction amount per one time for correcting the display position is adjusted, and a correction amount per one time is made smaller than a total correction amount up to a control target value, for example, by performing the display position correction in a plurality of times. Accordingly, the feeling of discomfort the user experiences in the visual field of is reduced.

[First Example of Correction Amount Adjustment]

A first example illustrates an operation of changing a display position in a plurality of times when a change amount of an attitude angle with respect to a calculation value of a previous measurement is large (for example, 0.3 degree or more) and a correction amount for display positions before and after the update is equal to or greater than a predetermined value. In this case, the processing unit 50 divides the correction amount of the display position into predetermined values, and steadily changes the display position at a plurality of timings. As described above, in the first example, a correction amount of the display position per unit time is set by equally dividing the total correction amount up to the control target value. With respect to the correction amount per unit time, it is not limited to setting the correction amount equally in each of a plurality of periods into which a period for correcting the display position is divided, and an arbitrary value may be set in each of the divided periods.

With respect to the correction amount of the display position, it is possible to adopt various modes such as setting the correction amount per one time for correcting the display position to a predetermined fixed value smaller than the total correction amount, setting the number of divisions with respect to the total correction amount to a fixed value, and varying the correction amount per one time and/or the number of divisions in accordance with a magnitude of the total correction amount. Specifically, for example, when the change amount of the attitude angle is 0.5 degree, the display position is shifted at 0.05 degree/second for 10 times in a period of 10 seconds.

Here, the total correction amount of the display position is a total movement amount of the display position that is changed in accordance with the change amount of the attitude angle, and normally corresponds to a movement amount from a current position to a control target position for canceling the change of the attitude angle with respect to the road surface. In a head-up display device, a correction amount of a display position is represented by a change amount of an irradiation angle of light for projecting a virtual image, and a displacement (the number of pixels, the number of lines, or the like) on a display screen of an image forming unit corresponding to an angle is given as a control value from the processing unit 50 to the image projection unit 30. Since an image visually recognized by the user is formed in a three-dimensional space, in the display position control, even if a correction amount of the same angle is used, a displacement amount on the display screen of the image forming unit may be different depending on a position in a display area of a target space.

In the first example, when the change amount of the attitude angle of the vehicle is equal to or greater than a predetermined value and the attitude is greatly changed, in the display position control, the correction amount per one time for correcting the display position is reduced and the correction up to the control target value is not performed at one time. Accordingly, a mode is established in which the image projected from the image projection unit moves in a stepwise manner. Accordingly, it is possible to prevent the image from moving greatly at one time, and it is possible to prevent a feeling of discomfort in appearance for the user.

[Second Example of Correction Amount Adjustment]

A second example is a modification of the first example, and illustrates an operation of gradually changing a display position such that a correction amount is large in an initial stage and then the correction amount is reduced steadily as approaching a control target position in a case where correction of the display position is performed in a plurality of times. That is, when changing the display position in a plurality of times, the display position is steadily changed with a predetermined time constant. In this case, the processing unit 50 divides a correction amount of the display position, for example, by using a logarithmic function, and steadily changes the display position at a plurality of timings. As described above, in the second example, a correction amount of the display position per unit time is set to decrease with elapse of time with respect to a total correction amount up to a control target value.

With respect to the correction amount of the display position, it is possible to adopt various modes such as setting the correction amount that steadily decreases from a large state to a small state by each predetermined unit time, and steadily lengthening, from a short state to a long state, the timing of correction by the correction amount per one time as a predetermined fixed value or variable value. Specifically, for example, when the change amount of the attitude angle is 0.5 degree, a correction amount per second is steadily reduced to 0.1 degree, 0.05 degree, 0.025 degree, 0.0125 degree, . . . , and the display position is shifted such that the display position changes greatly (quickly) in the initial stage and then gradually (slowly) changes.

In the second example, when a change amount of an attitude angle of a vehicle is equal to or greater than a predetermined value and an attitude is greatly changed, in the display position control, a correction amount per one time for correcting the display position is reduced with elapse of time without performing the correction up to the control target value at one time. Accordingly, a mode is established in which an image projected from an image projection unit moves quickly in the initial stage and steadily slows down as approaching a target position. Accordingly, it is possible to prevent the image from moving greatly in an instant, and it is possible to prevent a feeling of discomfort in appearance for the user.

Note that the first example and the second example may be combined. For example, a period in which a display position is corrected may be divided into a plurality of periods, and a correction amount per unit time may be equally divided or set to an arbitrary value in each of the periods after the division, or the correction amount per unit time may be set to decrease with elapse of time in an entire correction period. As described above, with respect to the correction amount of the display position, various modifications can be applied as long as a method is used in which the correction amount per one time for correcting the display position is made smaller than the total correction amount up to the control target value.

[Third Example of Correction Amount Adjustment]

A third example shows an operation of changing a display position at one time in performing correction of the display position when image display of a virtual image such as that of navigation information is turned off for a predetermined time or more. For example, in an image display system, when navigation information is projected and displayed so as to look like being superimposed on a road surface, the navigation information is not always displayed, but is intermittently displayed at an appropriate timing depending on a traveling position of a vehicle such as an intersection. In this case, even in the middle of steadily changing the display position by the first example or the second example, the processing unit 50 switches a correction mode of the display position and immediately changes the display position to a control target position when there is a period in which the virtual image is not rendered for a predetermined time or more. That is, when the image display is stopped for a predetermined time or more, the correction mode of the display position is switched from a stepwise display position correction to an instant display position correction. As described above, in the third example, when there is a period in which an image is not rendered for a predetermined time or more, a correction amount of the display position is switched to a correction amount for correcting to a control target value at one time.

In the third example, in a case of a timing at which display of a projection image is turned off, the display position is corrected to the control target position at one time regardless of a change amount of an attitude angle, so that it is possible to quickly and appropriately control the display position.

[Control Procedure of Display Position]

Here, as an example of a control procedure of a display position according to the present embodiment, an operation example of display position control in each of a stopped state and a traveling state will be described.

Figure 8:
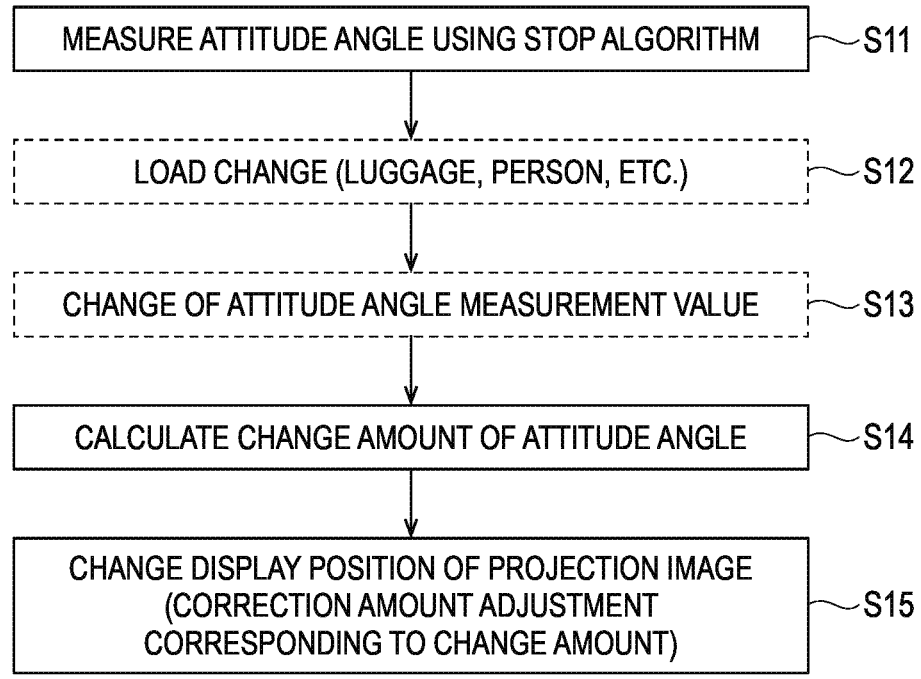
FIG. 8 is a flowchart illustrating an operation of display position control at the time of stop in the display control device according to the embodiment.

FIG. 8 is a flowchart illustrating an operation of display position control at the time of stop in the display control device according to the embodiment. When the vehicle 100 is in a stopped state, the processing unit 50 measures an attitude angle of the vehicle 100 during stop based on a detection value of a gravitational acceleration by using the above-described stop algorithm (S11). At this time, when a load change occurs due to an increase or decrease in luggage, an increase or decrease in the number of occupants, or the like (S12), a measurement value of the attitude angle by the attitude angle calculation unit 43 changes (S13). The processing unit 50 calculates a change amount of the attitude angle of the vehicle 100 at this time (S14). When obtaining the change amount of the attitude angle, the processing unit 50 calculates the change amount in accordance with, for example, an average value of attitude angle measurement values in units of several minutes in consideration of various influences such as disturbance, noise, and measurement error, and updates the attitude angle measurement value. Then, the processing unit 50 controls the image forming unit 2 to execute the display position control processing while adjusting a correction amount corresponding to the change amount of the attitude angle as described above, and changes a display position of a projection image by the projection unit 3 (S15).

Figure 9:
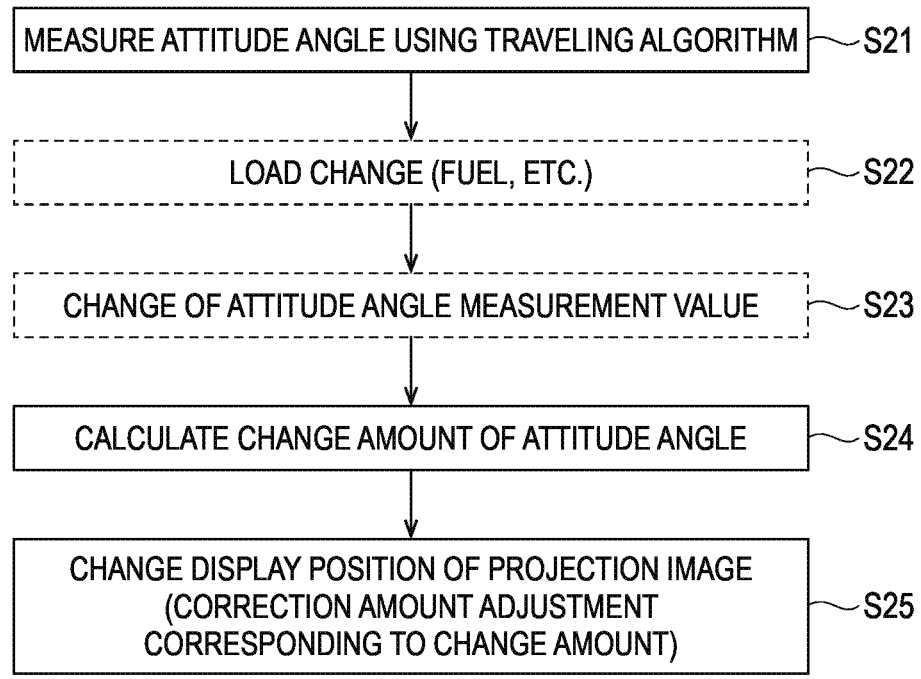
FIG. 9 is a flowchart illustrating an operation of display position control during traveling in the display control device according to the embodiment.

FIG. 9 is a flowchart illustrating an operation of display position control at the time of traveling in the display control device according to the embodiment. When the vehicle 100 is in a traveling state, the processing unit 50 measures an attitude angle of the vehicle 100 during traveling based on a detection value of a motion acceleration by using the above-described traveling algorithm (S21). At this time, when a load change occurs due to a decrease in fuel such as gasoline or a movement of an occupant during traveling (S22), a measurement value of the attitude angle by the attitude angle calculation unit 43 changes (S23). The processing unit 50 calculates a change amount of the attitude angle of the vehicle 100 at this time (S24). When obtaining the change amount of the attitude angle, the processing unit 50 calculates the change amount in accordance with, for example, an average value of attitude angle measurement values in units of several minutes in consideration of various influences such as disturbance, noise, and measurement error, and updates the attitude angle measurement value. Then, the processing unit 50 controls the image forming unit 2 to execute the display position control processing while adjusting a correction amount in accordance with the change amount of the attitude angle as described above, and changes a display position of a projection image by the projection unit 3 (S25).

Figure 10:
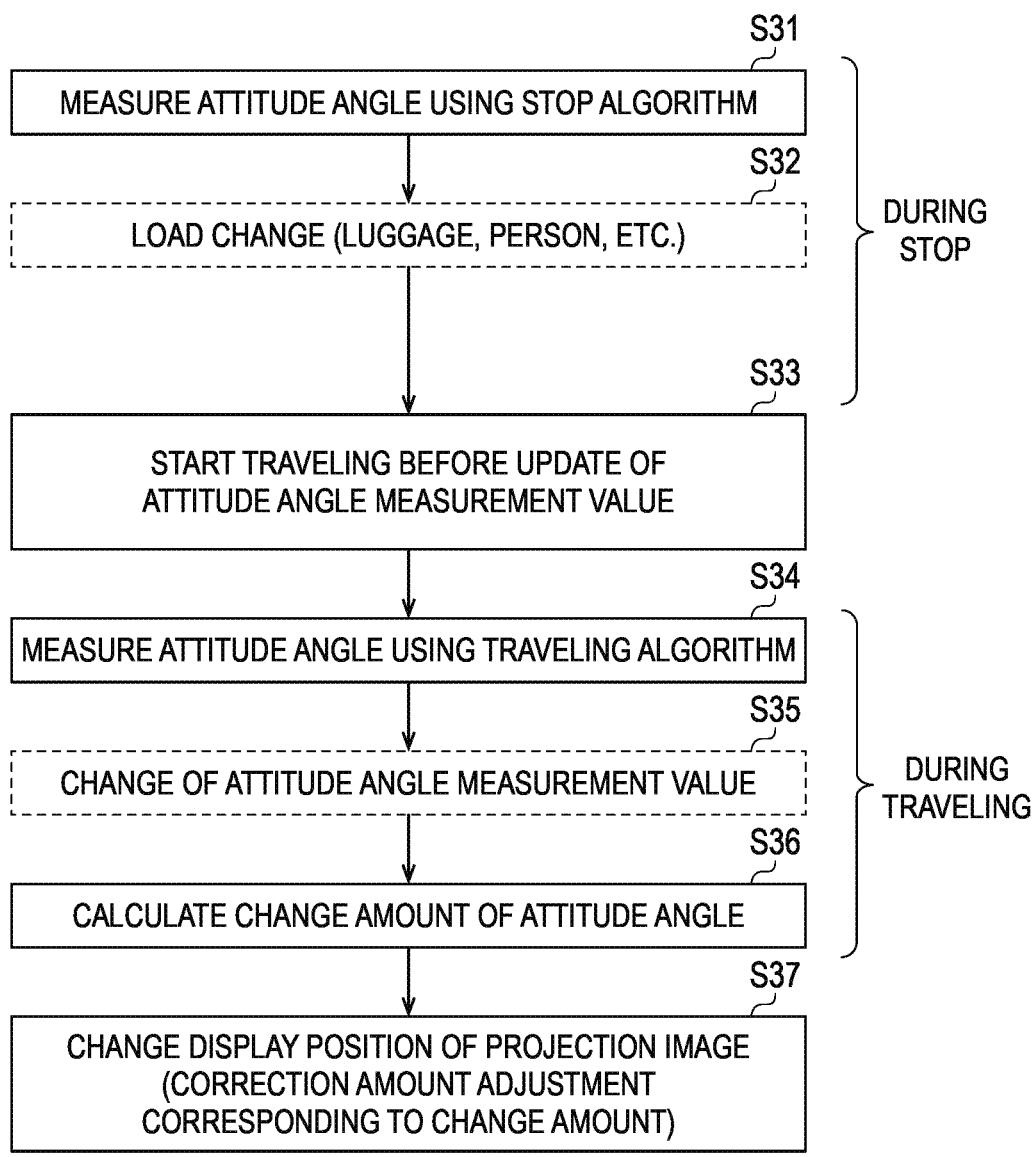
FIG. 10 is a flowchart illustrating an operation of display position control in the display control device according to the embodiment in a case of shifting from stop to traveling.

FIG. 10 is a flowchart illustrating an operation of display position control in the display control device according to the embodiment in a case of shifting from stop to traveling. The operation example of FIG. 10 illustrates a case where an attitude change occurs during stop and the vehicle shifts to traveling within a short period of time. For example, this corresponds to cases such as one where a person gets in and out of the vehicle while the vehicle is stopped and traveling starts immediately. In a state where the vehicle 100 is stopped, the processing unit 50 measures an attitude angle of the vehicle 100 during stop based on a detection value of a gravitational acceleration by using the stop algorithm (S31). At this time, a load change occurs due to an increase or decrease in the number of occupants (S32), and the vehicle 100 starts traveling before the processing unit 50 updates the attitude angle measurement value (S33). When the vehicle 100 enters a traveling state, the processing unit 50 measures an attitude angle of the vehicle 100 during traveling based on a detection value of a motion acceleration by using the traveling algorithm (S34). In this case, since the vehicle travels after the load change occurs at the time of stopping, the measurement value of the attitude angle by the attitude angle calculation unit 43 changes (S35). The processing unit 50 calculates a change amount of the attitude angle of the vehicle 100 at this time (S36). When obtaining the change amount of the attitude angle, the processing unit 50 calculates the change amount in accordance with, for example, an average value of attitude angle measurement values in units of several minutes in consideration of various influences such as disturbance, noise, and measurement error, and updates the attitude angle measurement value. Then, the processing unit 50 controls the image forming unit 2 to execute the display position control processing while adjusting a correction amount in accordance with the change amount of the attitude angle as described above, and changes a display position of a projection image by the projection unit 3 (S37).

According to the procedures of the operation examples described above, in each of the case where the vehicle is stopped, the case where the vehicle is traveling, and the case where the vehicle is immediately shifted from stop to traveling, the change amount is calculated by measuring the attitude angle of the vehicle, and the correction amount is adjusted in accordance with the change amount of the attitude angle, thereby enabling control of the display position of the projection image.

[Fourth Example of Correction Amount Adjustment]

Next, as a fourth example of the correction amount adjustment, an operation of performing the correction amount adjustment in accordance with a deviation in an attitude angle measurement value by using the traveling algorithm will be described.

FIG. 11 is an illustrative table illustrating an example of a correction amount of a display position corresponding to a deviation in an attitude angle measurement value during traveling and a change amount of the attitude angle according to the embodiment. The processing unit 50 changes the correction amount of the display position in accordance with the deviation in the attitude angle measurement value during traveling. In addition, the processing unit 50 switches an adjustment operation of the correction amount in accordance with the change amount of the attitude angle.

When calculating the change amount of the attitude angle of the vehicle during traveling, as described above, the change amount of the attitude angle is calculated by obtaining an average value of attitude angle measurement values in a predetermined period such as several seconds to several minutes. At this time, when a deviation of the attitude angle measurement value during traveling is large and variation of the detected attitude angle is large, it is assumed that influence of disturbance or the like is large, and it is considered that reliability of the attitude angle measurement value is low. In contrast, when the deviation of the attitude angle measurement value is small, it is considered that a sensor output for attitude angle measurement is stable and the reliability of the attitude angle measurement value is high.

The processing unit 50 sets a predetermined first threshold TH1 and a predetermined second threshold TH2 (TH1<TH2) as deviation thresholds in order to determine a magnitude of the deviation of the attitude angle measurement value. In accordance with the deviation of the attitude angle measurement value during traveling, when the deviation of the attitude angle measurement value during traveling is less than the first threshold TH1, the reliability of the attitude angle measurement value is high, and thus the processing unit 50 sets the correction amount in accordance with a value of the attitude angle after change so as to offset the attitude angle change amount, and changes the display position. In addition, when the deviation of the attitude angle measurement value during traveling is equal to or greater than the first threshold TH1 and less than the second threshold TH2 (between TH1 and TH2), the reliability of the attitude angle measurement value is at a medium degree, and thus the processing unit 50 sets the correction amount by using an intermediate value of the attitude angles before and after change as a control target value, and changes the display position. In this case, the "intermediate value" set as the control target value may be an arbitrary value that is greater than zero and is up to the value (corresponding to the attitude angle change amount) of the attitude angle after change, and the value is not limited. Preferably, the intermediate value may be a value (median value) in the middle of the attitude angles before and after change. Then, a total correction amount corresponding to the control target value of the set intermediate value is calculated, and the display position is corrected. The deviation threshold is not limited to the two examples described above, and one or three or more thresholds may be provided. Further, the number of arbitrary values of the intermediate value and the deviation threshold corresponding thereto are not limited to one, and may be plural. In addition, a deviation amount of the attitude angle measurement value and the control target value may be interlocked with each other. For example, based on a predetermined function such as control target value=attitude angle change amount×A/deviation amount (A is a weighting coefficient), the control target value may be set to be large when the deviation amount is small, and the control target value may be set to be small as the deviation amount is large.

When the deviation of the attitude angle measurement value during traveling is equal to or greater than the second threshold TH2, the reliability of the attitude angle measurement value is low, and thus the processing unit 50 sets the correction amount to zero and does not correct the display position. A deviation threshold, at which the deviation of the attitude angle is large and the display position is not corrected, may be separately set as a third threshold TH3. For example, the third threshold TH3 is set to a value greater than the first threshold TH1 and equal to or less than the second threshold TH2. In the case of the example shown in FIG. 11, the second threshold TH2 is equal to the third threshold TH3.

At this time, regarding adjustment of the correction amount of the display position, the processing unit 50 switches a control mode of the display position in accordance with the change amount of the attitude angle. For example, when the change amount of the attitude angle is equal to or greater than a predetermined value and equal to or greater than a predetermined change amount threshold, the display position needs to be changed greatly, and accordingly the processing unit 50 performs such display position control processing as in the second example described above in which the display position is changed greatly in an initial stage and then changed stepwise gradually. When the change amount of the attitude angle is equal to or larger than the predetermined value and less than the predetermined change amount threshold, the total correction amount of the display position is small, and accordingly the processing unit 50 performs such display position control processing as in the first example described above in which the display position is changed stepwise linearly.

In the fourth example, when the deviation of the attitude angle measurement value is large, the total correction amount with respect to the attitude angle change is set to an intermediate value before and after change, and a change amount of a display image due to the display position correction is reduced. Further, when the deviation of the attitude angle measurement value is large, the correction amount is set to zero so that the display position correction is not performed. Accordingly, it is possible to appropriately correct the display position in accordance with the reliability based on the variation of the attitude angle measurement value. At this time, in a case of a state where the reliability of the attitude angle measurement value is not very high (medium degree), the correction amount is reduced to an intermediate value, and excessive correction of the display position can be prevented. In addition, when the reliability of the attitude angle measurement value is low, the display position is not corrected, and a failure of the display position correction due to external noise or the like can be prevented.

When the change amount of the attitude angle is relatively small, the display position correction is performed in which the position is changed steadily at a constant speed following the procedure of the first example described above, and when the change amount of the attitude angle is relatively large, the display position correction is performed in which the position is changed steadily with a time constant following the procedure of the second example described above. Accordingly, when the change amount of the attitude angle is relatively large, the display position can be controlled so as to move quickly in an initial stage and approach the control target position steadily and slowly, and it looks as if the image changes smoothly for the user. In addition, when the change amount of the attitude angle is relatively small, the display position can be controlled so as to approach the control target position gradually at a constant speed, and it looks as if the image changes quickly and smoothly for the user. In this way, the display position can be smoothly controlled in accordance with a magnitude of the change amount of the attitude angle without giving the user a feeling of discomfort in appearance.

As described above, in the present embodiment, the display control device controls a display position of an image in the image projection unit 30 that projects the image onto a display object such as the front shield 101 of the vehicle 100 serving as an example of a mobile body. The display control device includes the processing unit 50 that performs processing related to correction of the display position. The processing unit 50 includes the position correction unit 4 that sets a correction amount used for correction of the display position, and the display control unit 51 that controls the display position of the image based on the correction amount set by the position correction unit 4. The position correction unit 4 acquires a detection value of an acceleration acting on the vehicle 100 from the acceleration sensor 52, and calculates an attitude angle of the vehicle 100 based on the acquired detection value of the acceleration. The position correction unit 4 sets the correction amount of the display position for controlling the display position of the image to be projected on the display object in accordance with the attitude angle. The correction amount of the display position in the position correction unit 4 is set by adjusting a correction amount per predetermined unit time in accordance with a change amount of the attitude angle in a predetermined period. Accordingly, it is possible to control the display position of the image in accordance with the change amount of the attitude angle, and it is possible to prevent a problem in appearance for the user.

In addition, in the present embodiment, in the setting of the correction amount of the display position, when the change amount of the attitude angle is equal to or larger than a predetermined value, the position correction unit 4 sets a correction amount per one time for correcting the display position to be smaller than a total correction amount up to a control target value. Accordingly, it is possible to prevent a projected image from moving greatly at one time, and it is possible to prevent a feeling of discomfort in appearance for the user.

In addition, in the present embodiment, when the change amount of the attitude angle is equal to or greater than a predetermined value, the position correction unit 4 corrects the display position in a plurality of times, and reduces the correction amount per one time for correcting the display position. Accordingly, it is possible to prevent a projected image from moving greatly at one time, and it is possible to prevent a feeling of discomfort in appearance for the user.

In addition, in the setting of the correction amount per one time for correcting the display position in the present embodiment, the position correction unit 4 sets the correction amount of the display position per unit time by equally dividing the total correction amount up to the control target value. Accordingly, the display position can be controlled so that the image steadily approaches a control target position, and it looks as if the image changes quickly and smoothly for the user.

In addition, in the setting of the correction amount per one time for correcting the display position in the present embodiment, the position correction unit 4 sets the correction amount of the display position per unit time to decrease with elapse of time, with respect to the total correction amount up to the control target value. Accordingly, the display position can be controlled so as to move quickly in an initial stage and approach the control target position steadily and slowly, and it looks as if the image changes smoothly for the user.

In addition, in the setting of the correction amount per one time for correcting the display position in the present embodiment, when the change amount of the attitude angle is equal to or greater than a predetermined value and equal to or greater than a predetermined change amount threshold, the position correction unit 4 sets the correction amount of the display position per unit time by equally dividing the total correction amount up to the control target value, or sets the correction amount of the display position per unit time to an arbitrary value. In addition, when the change amount of the attitude angle is equal to or greater than the predetermined value and less than the change amount threshold, the processing unit 50 sets the correction amount of the display position per unit time to decrease with elapse of time. Accordingly, the display position can be smoothly controlled in accordance with a magnitude of the change amount of the attitude angle without giving the user a feeling of discomfort in appearance.

In addition, in setting the correction amount of the display position in the present embodiment, the position correction unit 4 adjusts the correction amount per one time for correcting the display position in accordance with a deviation of a measurement value of the attitude angle in a predetermined period. Accordingly, it is possible to appropriately correct the display position in accordance with reliability based on variation of the attitude angle measurement value.

In addition, in the present embodiment, when the deviation of the attitude angle measurement value is equal to or greater than a first threshold of a predetermined deviation threshold and less than a second threshold greater than the first threshold, the position correction unit 4 sets the correction amount by using an intermediate value before and after change of the attitude angle as the control target value. Accordingly, in a case of a state where the reliability of the attitude angle measurement value is not so high, the correction amount can be reduced to prevent excessive correction of the display position.

In addition, in the present embodiment, when the deviation of the attitude angle measurement value is equal to or greater than a third threshold of the predetermined deviation threshold, the position correction unit 4 sets the correction amount of the display position to zero. Accordingly, in a case of a state where the reliability of the attitude angle measurement value is low, the display position is not corrected, and a failure of correction due to external noise or the like can be prevented.

In addition, in the present embodiment, when there is a period in which an image to be projected onto a display object is not rendered for a predetermined time or more, the position correction unit 4 switches the correction amount of the display position to a correction amount for correcting to the control target value at one time. Accordingly, in a case of a timing at which display of the image is turned off, the display position is corrected to the control target position at one time, so that it is possible to quickly and appropriately control the display position.

In addition, in the present embodiment, when the vehicle 100 is stopped, the position correction unit 4 calculates the attitude angle of the vehicle 100 based on acceleration components of a gravitational acceleration in at least two directions including an up-down direction of the vehicle 100 and an orthogonal direction orthogonal to the up-down direction. Accordingly, it is possible to appropriately measure an attitude angle during stop of a mobile body.

In addition, in the present embodiment, when the vehicle 100 is traveling, the position correction unit 4 calculates the attitude angle of the vehicle 100 based on acceleration components of a motion acceleration in at least two directions including an up-down direction of the vehicle 100 and an orthogonal direction orthogonal to the up-down direction. Accordingly, it is possible to appropriately measure an attitude angle during traveling of a mobile body.

In addition, in the present embodiment, the position correction unit 4 may be capable of switching, by setting of a user, a correction mode of the display position between a mode in which correction up to the control target value is performed in a stepwise manner and a mode in which correction up to the control target value is performed at one time. In addition, in the mode in which the position correction unit 4 performs the correction up to the control target value in a stepwise manner, the user may be able to set the correction amount per one time for correcting the display position.

In addition, in the present embodiment, the image display system is mounted on the vehicle 100 serving as an example of a mobile body, and includes the image projection unit 30 that projects an image onto a display object such as the front shield 101 of the vehicle 100, and the display control device that includes the position correction unit 4 described above.

Accordingly, it is possible to provide an image display system capable of appropriately controlling a display position of an image in accordance with a change amount of an attitude angle.

In addition, in the present embodiment, the vehicle 100 serving as an example of a mobile body includes the image display system described above. The display object in the mobile body is a windshield such as the front shield 101 of the vehicle 100. Accordingly, it is possible to provide a mobile body capable of appropriately controlling a display position of an image in accordance with a change amount of an attitude angle.

Although various embodiments have been described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the various embodiments described above may be combined optionally in a range without deviating from the spirit of the invention.

The present application is based on Japanese Patent Application No. 2019-120438 filed on Jun. 27, 2019, the contents of which are incorporated herein by reference.

The present disclosure has an effect of improving control of a display position of an image, and is useful as, for example, a display control device of a display unit using a head-up display device or the like, an image display system, a mobile body, a display control method, and a program.

The invention claimed is:

1. A display control device configured to control a display position of an image in an image projector configured to project the image onto a display object of a mobile body, the display control device comprising:
a processor; and
a memory storing instructions that, when executed by the processor, cause the display control device to perform operations comprising:
setting a correction amount used for correction of the display position; and
controlling the display position of the image based on the correction amount,
wherein the setting the correction amount comprises:
acquiring a detection value of an acceleration acting on the mobile body;
calculating an attitude angle of the mobile body based on the detection value of the acceleration; and
setting the correction amount of the display position for controlling the display position of the image to be projected onto the display object in accordance with the attitude angle, and
wherein the correction amount of the display position is set by adjusting a correction amount per predetermined unit time in accordance with a change amount of the attitude angle in a predetermined period.

2. The display control device according to claim 1, wherein the setting the correction amount of the display position comprises making a correction amount per one time for changing the display position smaller than a total correction amount up to a control target value in a case in which the change amount of the attitude angle is equal to or greater than a predetermined value.

3. The display control device according to claim 2, wherein the setting the correction amount of the display position comprises performing correction of the display position a plurality of times to reduce the correction amount per one time for changing the display position in a case in which the change amount of the attitude angle is equal to or greater than a predetermined value.

4. The display control device according to claim 3, wherein the setting the correction amount of the display position comprises one of:
setting the correction amount per one time for changing the display position to a predetermined fixed value;
setting a number of divisions with respect to the total correction amount to a fixed value; and
varying, in accordance with a magnitude of the total correction amount, at least one of the correction amount per one time and the number of divisions.

5. The display control device according to claim 2, wherein the setting the correction amount per one time for changing the display position comprises setting the correction amount of the display position per unit time by equally dividing the total correction amount up to the control target value.

6. The display control device according to claim 2, wherein the setting the correction amount per one time for changing the display position comprises setting the correction amount of the display position per unit time with respect to the total correction amount up to the control target value so as to decrease with elapse of time.

7. The display control device according to claim 2, wherein the setting of the correction amount per one time for changing the display position comprises:
setting the correction amount of the display position per unit time by equally dividing the total correction amount up to the control target value or setting the correction amount of the display position per unit time to an arbitrary value in a case in which the change amount of the attitude angle is equal to or greater than a predetermined value and also equal to or greater than a predetermined change amount threshold; and
setting the correction amount of the display position per unit time to decrease with elapse of time in a case in which the change amount of the attitude angle is equal to or greater than the predetermined value and also less than the change amount threshold.

8. The display control device according to claim 2, wherein the setting of the correction amount of the display position comprises adjusting the correction amount per one time for changing the display position in accordance with a deviation of a measurement value of the attitude angle in the predetermined period.

9. The display control device according to claim 8, wherein the setting of the correction amount of the display position comprises setting the correction amount by using an intermediate value of values before and after change of the attitude angle as a control target value in a case in which the deviation of the measurement value of the attitude angle is equal to or greater than a first threshold of a predetermined deviation threshold and also less than a second threshold greater than the first threshold.

10. The display control device according to claim 8, wherein the setting of the correction amount of the display position comprises setting the correction amount of the display position to zero in a case in which the deviation of the measurement value of the attitude angle is equal to or greater than a third threshold of the predetermined deviation threshold.

11. The display control device according to claim 1, wherein the setting of the correction amount of the display position comprises switching the correction amount of the display position to a correction amount so as to be corrected to the control target value at one time in a case in which there is a period in which an image to be projected on the display object is not rendered for a predetermined time or more.

12. The display control device according to claim 1, wherein the setting of the correction amount of the display position comprises calculating the attitude angle of the mobile body based on acceleration components of a gravitational acceleration in at least two directions comprising an up-down direction of the mobile body and an orthogonal direction orthogonal to the up-down direction in a case in which the mobile body is stopped.

13. The display control device according to claim 1, wherein the setting of the correction amount of the display position comprises calculating the attitude angle of the mobile body based on acceleration components of a motion acceleration in at least two directions including an up-down direction of the mobile body and an orthogonal direction orthogonal to the up-down direction in a case in which the mobile body is traveling.

14. The display control device according to claim 1, wherein the image comprises a first virtual image to be superimposed at a specific position in a real scene and a second virtual image indicating a state of the mobile body, and
wherein the correction amount of the display position is set with respect to at least the first virtual image.

15. The display control device according to claim 1, wherein the attitude angle is one of an angle indicating inclination of a reference plane of the mobile body with respect to a surface on which the mobile body is placed and an angle indicating inclination of an up-down axis of the mobile body from a vertical line in a gravitational direction.

16. The display control device according to claim 1, wherein the change amount is calculated based on a time average value of the attitude angle in the predetermined period.

17. An image display system to be mounted on a mobile body, the image display system comprising:
an image projector configured to project an image onto a display object of the mobile body; and
the display control device according to claim 1.

18. A mobile body comprising:
the image display system according to claim 17,
wherein the display object comprises a window shield of the mobile body.

19. A display control method for controlling a display position of an image in an image projector configured to project the image onto a display object of a mobile body, the display control method comprising:
acquiring a detection value of an acceleration acting on the mobile body;
calculating an attitude angle of the mobile body based on the detection value of the acceleration; and
setting a correction amount of the display position for controlling the display position of the image to be projected onto the display object in accordance with the attitude angle,
wherein the correction amount of the display position is set by adjusting a correction amount per predetermined unit time in accordance with a change amount of the attitude angle in a predetermined period.

20. A non-transitory computer-readable medium storing a program, when executed by a processor, causing a computer to execute the display control method according to claim 19.

* * * * *